United States Patent
Barbeau et al.

(10) Patent No.: US 6,479,965 B2
(45) Date of Patent: Nov. 12, 2002

(54) AUTOILLUMINATING RECHARGEABLE LAMP SYSTEM

(75) Inventors: Stefane E. Barbeau, Roxbury, MA (US); Duane B. Smith, Roxbury, MA (US); Donald Drumm, Billerica, MA (US)

(73) Assignee: Vessel Inc., Brookline, MA (US)

( * ) Notice: Subject to any disclaimer, the term of this patent is extended or adjusted under 35 U.S.C. 154(b) by 0 days.

(21) Appl. No.: 09/885,848

(22) Filed: Jun. 20, 2001

(65) Prior Publication Data

US 2001/0055207 A1 Dec. 27, 2001

Related U.S. Application Data

(60) Provisional application No. 60/214,095, filed on Jun. 26, 2000.

(51) Int. Cl.[7] .............................................. H01M 10/46
(52) U.S. Cl. ........................................................ 320/115
(58) Field of Search ................................ 320/107, 110, 320/112, 108, 109, 113, 114, 115; 362/20, 447, 806

(56) References Cited

U.S. PATENT DOCUMENTS

| | | | |
|---|---|---|---|
| 3,576,990 A | | 5/1971 | Johnson |
| 3,746,877 A | | 7/1973 | Seiter et al. |
| 3,885,211 A | * | 5/1975 | Gutai ........................... 320/108 |
| 4,374,354 A | * | 2/1983 | Petrovic et al. ............. 320/108 |
| 4,463,283 A | | 7/1984 | Penney et al. |
| 5,365,145 A | | 11/1994 | Fields |
| 5,426,347 A | | 6/1995 | Nilssen |
| 5,550,452 A | * | 8/1996 | Shirai et al. ................. 320/108 |
| 5,734,229 A | | 3/1998 | Bavaro et al. |

\* cited by examiner

Primary Examiner—Edward H. Tso
(74) Attorney, Agent, or Firm—Albert Peter Durigon

(57) ABSTRACT

A rechargeable lamp system includes a set of one or more self-standing rechargeable lighting fixtures (luminaries) removably received on a recharging platter. The luminaries each include a light diffusor resembling a candle that turn on when removed from the charging platter. The luminaries also turn on when power to the charging platter is turned off, which allows the set to be used as a table lamp, and has the added benefit of turning the luminaries on automatically during a power failure. The luminaries are each inductively coupled to the recharging platter, which enables to provide an aesthetically pleasing interface free of electrical contacts.

16 Claims, 8 Drawing Sheets

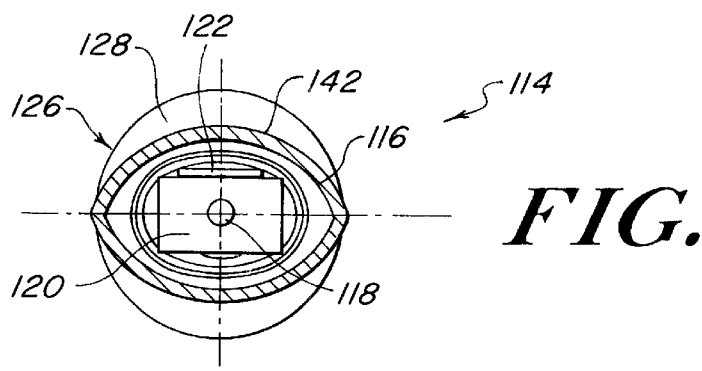
*FIG. 15*
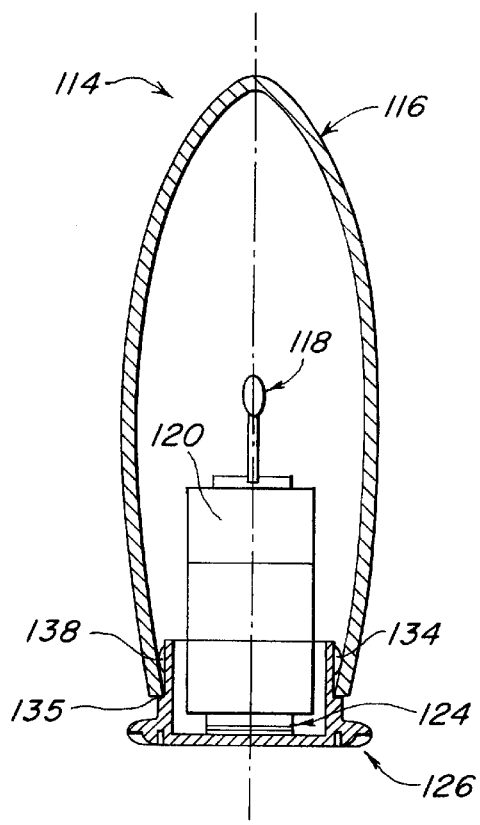
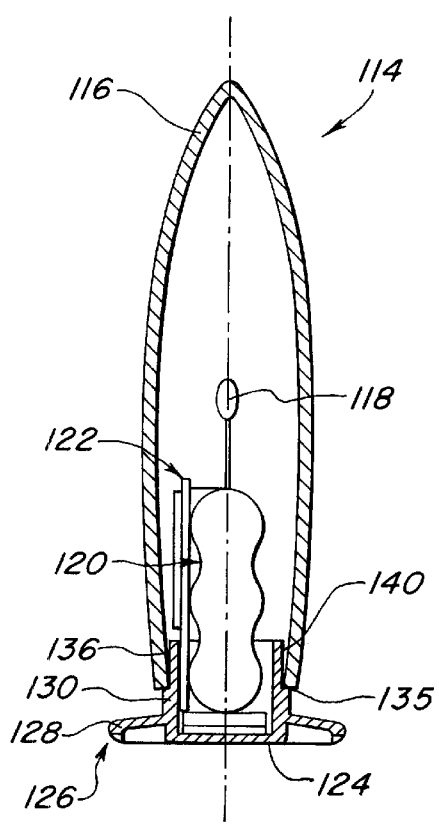
*FIG. 14*   *FIG. 13*

AUTOILLUMINATING RECHARGEABLE LAMP SYSTEM

This application claim benefit of Provisional Application No. 60/214,095 filed Jun. 26, 2000.

FIELD OF THE INVENTION

The present invention is drawn to the field of illumination, and more particularly, to a novel rechargeable lamp system.

BACKGROUND OF THE INVENTION

Candles may be moved and placed to provide illumination and/or ambience. While their utilitarian and aesthetic advantages are well-known, candles suffer from an undesirable self-consumption, needing to be replaced when used-up; produce smoke especially when snuffed, which may foul the air; require vigilant attendance to mitigate an ever-present fire hazard; are susceptible to being extinguished by gusts of air when used outdoors or moved around; and may give rise to undesirable wax build-up, which in many instances needs removed from candle support members or underlying structures.

There is thus a need to provide a rechargeable lamp system that enjoys the many utilitarian and aesthetic advantages of candles but is not subject to their disadvantages.

SUMMARY OF THE INVENTION

It is accordingly a general object of the present invention to disclose a rechargeable lamp system that provides candle-like lighting for indoor or outdoor use that avoids the problems associated with candles.

In accordance therewith, the rechargeable lamp system of the present invention includes a recharging platter adapted to receive a set of luminaries including a first circuit coupled to each luminary of said set of luminaries received thereon operative in response to supplied AC power to provide a charge signal to each luminary of said set of luminaries received thereon; and a set of luminaries each having a light emitting element connected to a rechargeable battery pack via a second circuit operative in one mode to charge said rechargeable battery pack in response to said charge signal when each luminary of said set of luminaries is received on said recharging platter and operative in another mode to activate said light emitting element in response to the absence of said signal, whereby, each said luminary lights if removed from said recharging platter and lights if no AC power is supplied to said recharging platter when received therein.

In the presently preferred embodiments, the set of luminaries includes one or more luminaries each of which is inductively coupled to the first circuit of the recharging platter. The inductive coupling provides automatic, hands-free recharging of the rechargeable battery pack of a luminary upon its receipt by the recharging platter, and provides automatic, hands-free actuation of a luminary when it is removed therefrom.

In the presently preferred embodiments, each luminary of the set of luminaries is self-standing and includes a diffusor that may be shaped to resemble a candle releasably mounted to a base member supporting said light emitting element therewithin.

BRIEF DESCRIPTION OF THE DRAWINGS

These and other objects, advantageous features and inventive aspects of the present invention will be more fully appreciated as the same becomes better understood from the following detailed description of the preferred embodiments when considered in connection with the accompanying drawings, in which:

FIG. 13 is a sectional view of the lamp module taken along line 13—13 of FIG. 9;

FIG. 14 is a sectional view of the lamp module taken along line 14—14 of FIG. 10.

FIG. 15 is a sectional view of the lamp module taken along line 15—15 of FIG. 9.

DETAILED DESCRIPTION OF THE PREFERRED EMBODIMENTS

Figure 1:
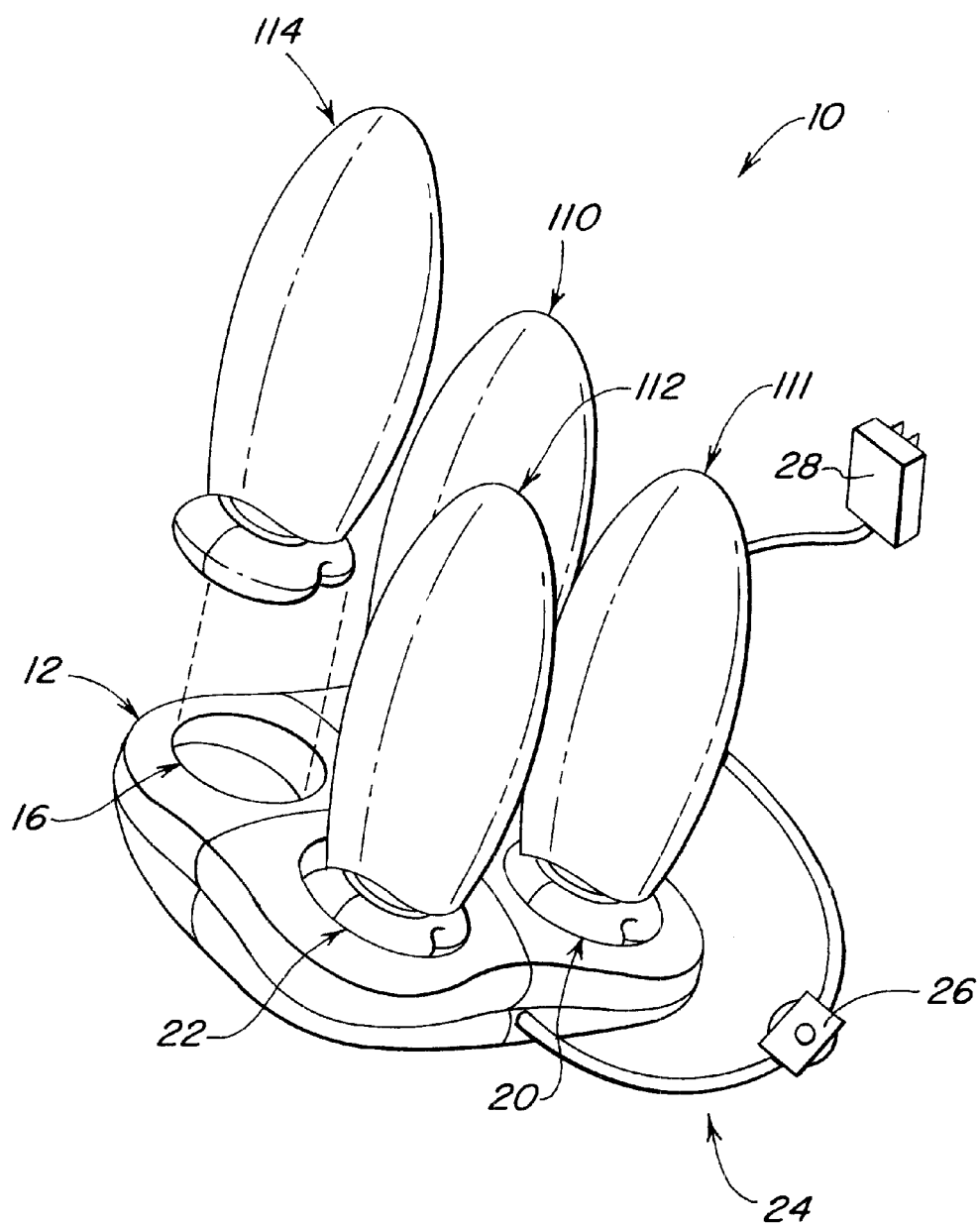
FIG. 1 is a perspective view of an exemplary embodiment of the present invention, showing a charging stand and one lamp module.

Referring now to FIG. 1, reference numeral 10 generally refers to the rechargeable lamp system of the present invention. Lamp system 10 comprises a charging stand 12 and a plurality of lamp modules 110, 111, 112 and 114.

Figure 2:
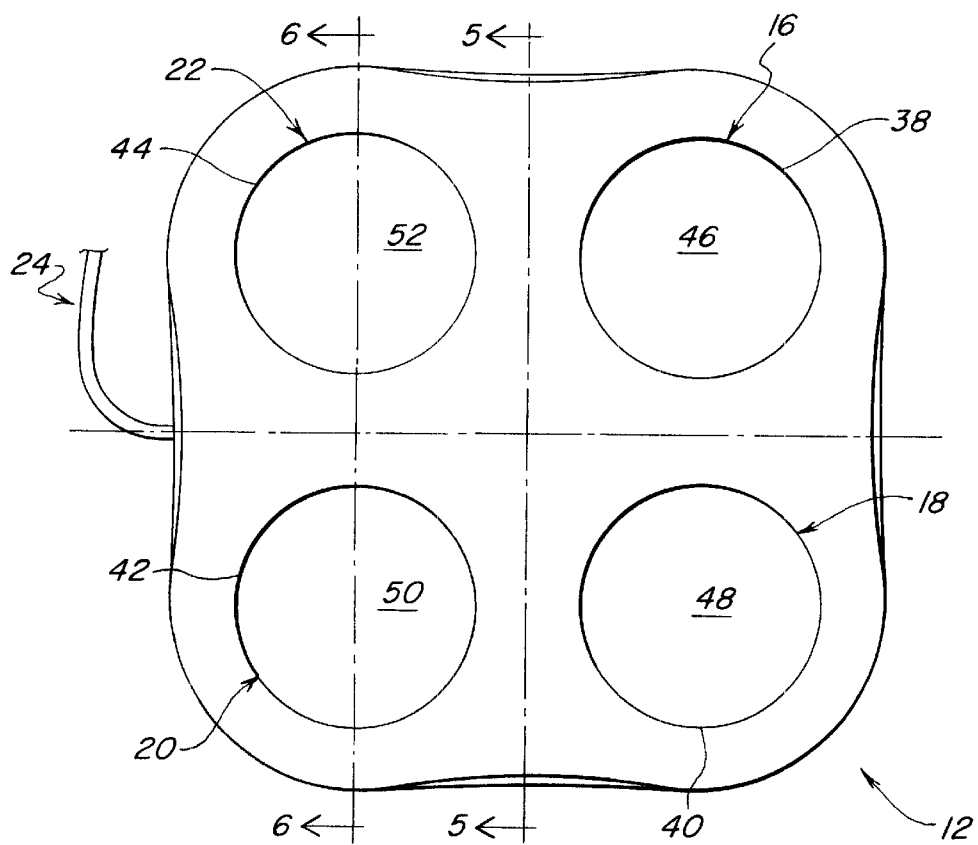
FIG. 2 is a top view of the charging stand.

As shown in FIGS. 1 and 2, stand 12 comprises slots 16, 18, 20 and 22 which are each adapted to removably receive one of said lamp modules 110, 111, 112 and 114. Slots 16, 18, 20 and 22 each include a respective cylindrical wall 38, 40, 42, and 44 and a substantially planar floor 46, 48, 50 and 52.

A power cord 24 having an inline power switch 26 and a "wall-block" style transformer provides power to charging stand 12 via ordinary 120-volt household current. In alternate embodiments, the transformer may be dispensed with.

As will be described in greater detail herein, each of modules 110, 111, 112 and 114 is battery-powered and designed to be charged by magnetic induction when placed in a respective one of slots 16, 18, 20 and 22. Modules 110, 111, 112 and 114 are each designed to illuminate when removed from slots 16, 18, 20 and 22, or when AC power is cut off to charging stand 12.

The number of lamp modules (and a corresponding slot for each module) shown in the preferred embodiment is intended to be merely exemplary. It should be understood that the lamp system 10 of the present invention may be constructed with any number of modules.

Figure 3:
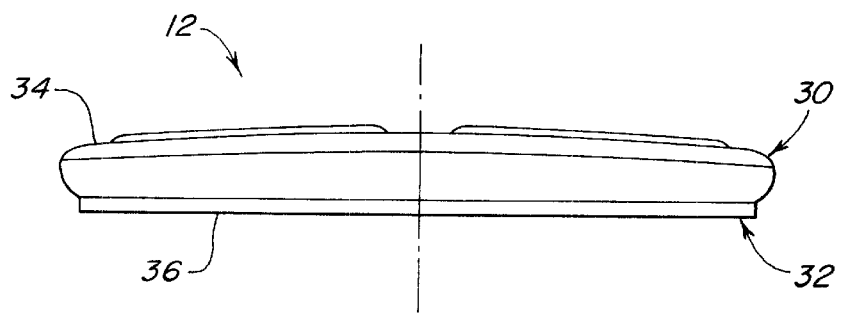
FIG. 3 is a front view of the charging stand.
Figure 4:
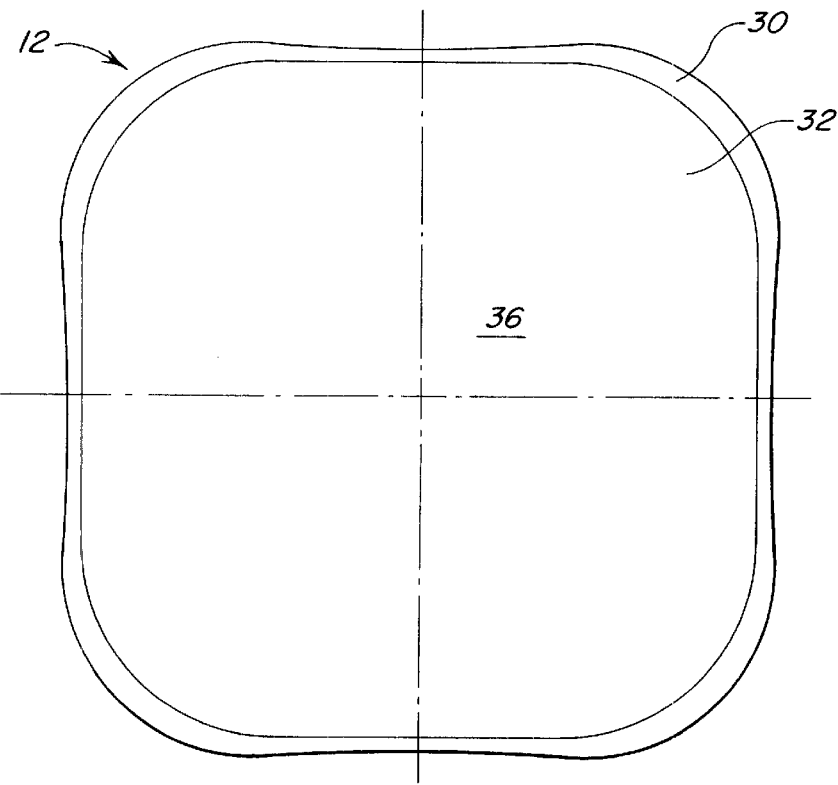
FIG. 4 is a bottom view of the charging stand.

Referring now to FIGS. 3–4, stand 12 also includes an upper portion 30 and a lower portion 32. In an exemplary embodiment, upper portion 30 is ceramic. However, upper portion 30 may be made from other suitable materials, such as wood or plastic. In the interest of economy, lower portion 32 in the exemplary embodiment is formed of injection-molded plastic, but may as well be made of other suitable materials, such as steel or other metal or other material. In the exemplary embodiment, upper portion 30 and lower portion 32 snap together. However, any suitable means, such as bonding, screws, etc. could be used to secure upper portion 30 and lower portion 32.

Figure 5:
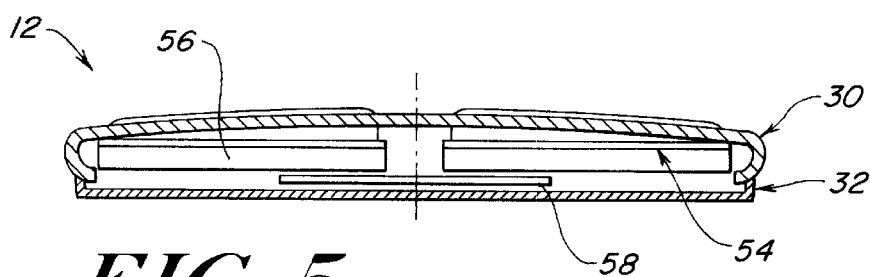
FIG. 5 is a sectional view of the charging stand, taken along line 5—5 of FIG. 2.
Figure 6:
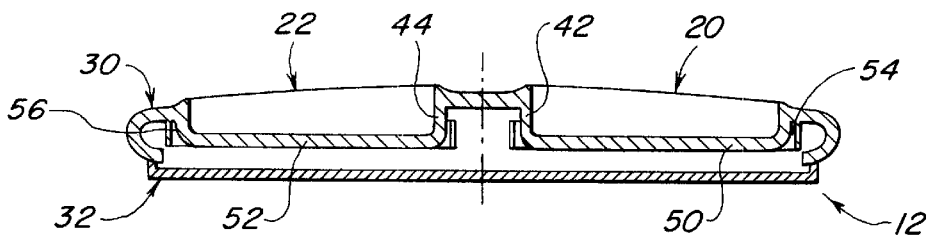
FIG. 6 is a sectional view of the charging stand, taken along line 6—6 of FIG. 2.

As shown in FIGS. 2, 5 and 6, stand 12 further includes a circuit board 58 which is hard-wired to cord 24 and four primary induction coils (wired in parallel), one coil encircling each of walls 38, 40, 42 and 44, respectively. FIG. 5 shows a pair of primary induction coils 54 and 56 that encircle walls 44 and 42, respectively. Identical primary coils (not shown) encircle walls 38 and 40.

Figure 7:
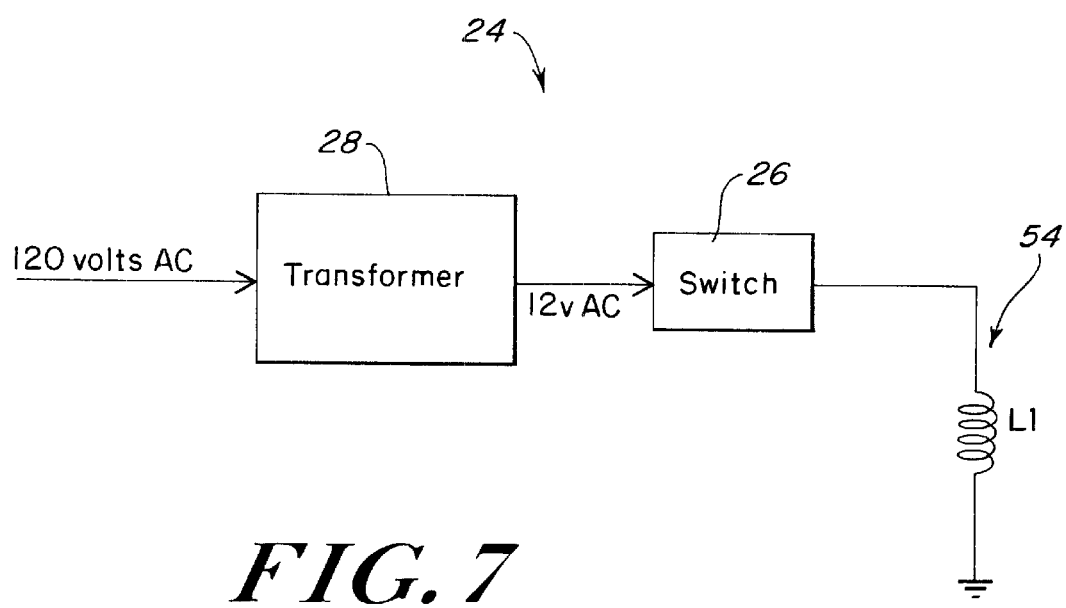
FIG. 7 is a circuit diagram of the charging stand circuit.
Figure 8:
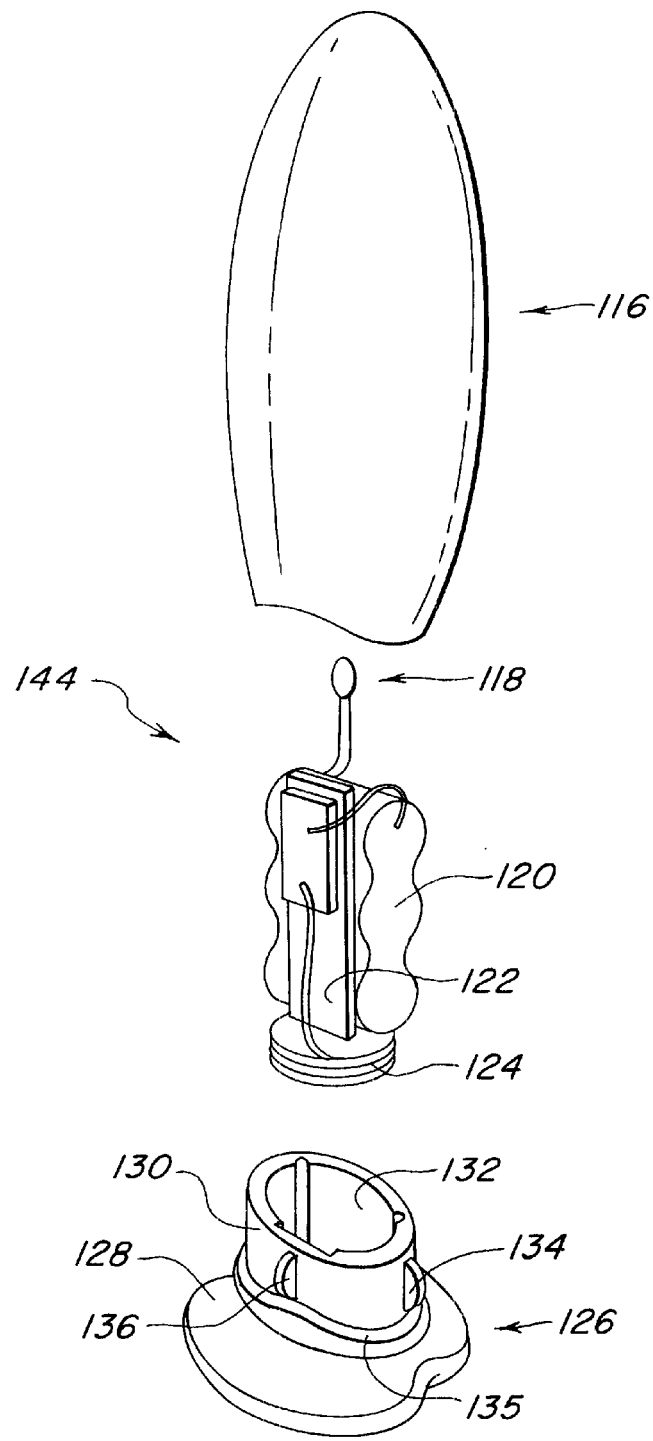
FIG. 8 is an exploded perspective view of an exemplary embodiment of a lamp module according to the present invention.
Figure 11:
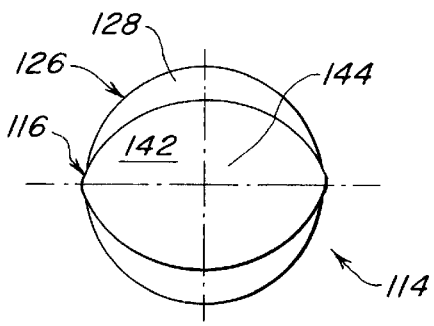
FIG. 11 is a top view of the lamp module.
Figure 10:
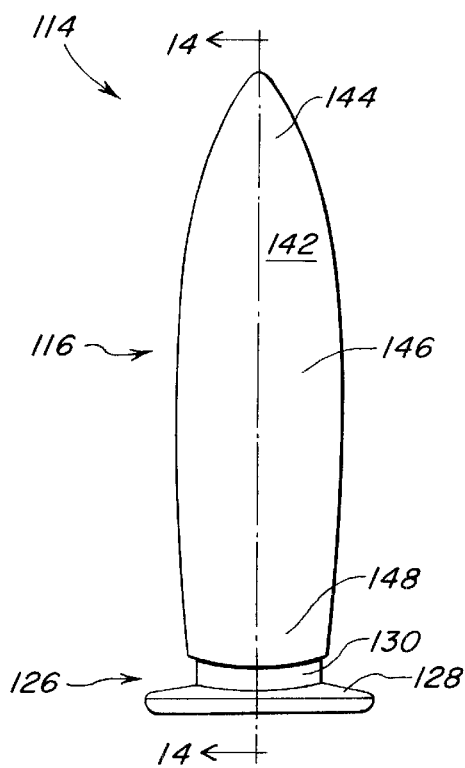
FIG. 10 is a right side view of the lamp module.
Figure 9:
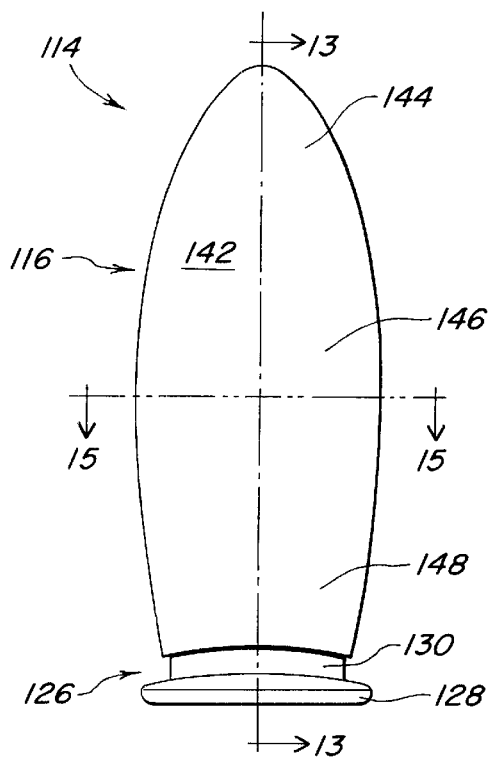
FIG. 9 is a front view of the lamp module.
Figure 12:
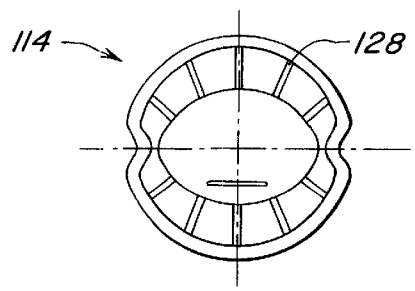
FIG. 12 is a bottom view of the lamp module.

FIG. 7 shows the circuit formed by transformer 28, inline power switch 26, and primary induction coil 54. As shown in FIG. 7, transformer 28 converts 120 volts AC to 12 volts AC. The three other primary induction coils, not shown, are preferably wired in parallel with primary induction coil 54. In other embodiments, the transformer component can be replaced by the inductor coils (on the platter and luminaries), whose turn-ratios are selected to provide a stepped-down voltage to the lamps. As will be appreciated by those of skill in the art, an oscillator providing frequencies higher than line frequency may be employed to improve efficiency (inductor size and attendant cost).

Modules 110, 111 and 112 are identical to module 114. Thus, it will only be necessary to describe module 114 in detail.

As shown in FIGS. 8–16, module 114 comprises a diffuser 116, a light bulb 118, a battery pack 120, a circuit board 122, a secondary induction coil 124 and a base 126.

Diffuser 116 in the exemplary embodiment is formed of blow-molded plastic (or glass) having a frosted outer surface 142. It could also be injection-molded plastic with a frosted, translucent finish. In the exemplary embodiment, diffuser 116 is slender and elongated in shape and includes a midsection 146 that tapers upwardly to a tip 144 and tapers slightly to a tail 148. This shape is chosen to provide optimal light color and transmission, as well as even diffusion of light from bulb 118. Obviously, numerous alternative shapes for diffuser 116 are possible. However, the internal volume created by diffuser 116 must be sufficient to envelop bulb 118, battery pack 120 and circuit board 122. In addition, because of the heat generated by bulb 118, it is desirable to provide air space between bulb 118 and diffuser 116 to prevent diffuser 118 from melting or deforming.

Base 126 comprises a lower portion 128 that provides stable support for module 114 when placed on a level surface or within slot 16. Neck 130 is adapted to removably receive diffuser 116 (to enable access to bulb 118 and battery pack 120). Neck 130 includes tabs 134, 136, 138 and 140 and a lip 135 that cooperate to secure tail 148 of module 114 to neck 130 (see FIGS. 8, 13 and 14).

Battery pack 120 in the exemplary embodiment comprises three "AA" Nickel-Cadmium (Ni-Cad) cells wrapped in PVC shrink-wrap and having a total output of 3.6Vdc and 500–800 mA. Of course, other types and sizes of rechargeable cells, such as Nickel-Metal-Hydride or Lithium cells, could be substituted for the Ni-Cad cells. Such cells would provide more power, and charge more quickly than Ni-Cads, but are substantially more expensive.

The power requirements for bulb 118 are, of course, chosen to match the power output of battery pack 120. In the exemplary embodiment, bulb 118 is a conventional miniature incandescent bulb, such as Chicago Miniature Lamp, Inc. part # CM1738, having an output of 1 candela and having design power requirements of 2.80V and 60 mA and an expected life of 6,000 hours. Of course, other lamps and types of light sources, such as a light-emitting diode (L.E.D.) may be substituted for bulb 118. The incandescent bulb shown is preferred because of its balance of cost, heat generation, power consumption, expected service life and brightness characteristics.

Figure 16:
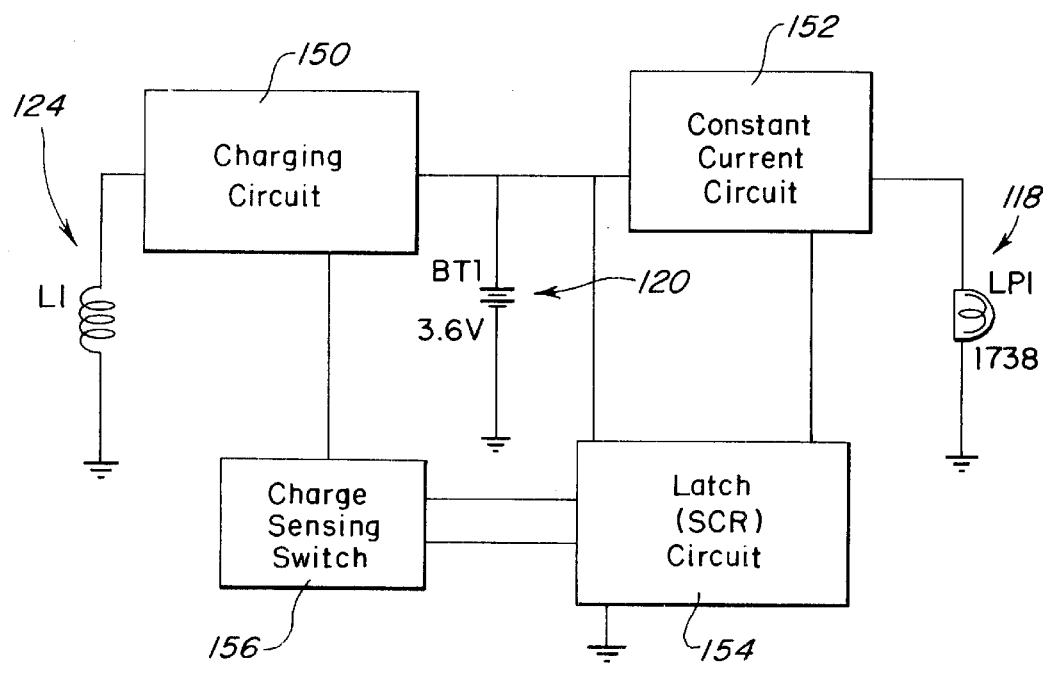
FIG. 16 is an exemplary embodiment of a circuit diagram of the lamp module circuit board according to the present invention.

As shown in FIGS. 13 and 14, bulb 118 and battery pack 120 are preferably hard-wired to circuit board 122. As shown in FIG. 16, circuit board 122 comprises four primary circuits that control the charging of battery pack 120 and the lighting of bulb 118.

A charging circuit 150 regulates the voltage and current flowing to battery pack 120 from secondary induction coil 124 to prevent damage to battery pack 120. A latch circuit 154 cuts off current to bulb 118 when the voltage output of battery pack 120 drops below 3.1 volts, thus preventing damage to battery pack 120 which could be caused by fully draining battery pack 120. A charge-sensing switch 156 works in cooperation with latch circuit 154 to turn off current to bulb 118 when current is detected in charging circuit 150. A constant current source circuit 152 provides a constant flow of current (65 mA in the exemplary embodiment) to bulb 118. This enables bulb 118 to shine at a constant brightness despite fluctuations in the output current from battery pack 120. In alternate embodiments, a constant voltage source could be employed.

As described above, battery pack 120 is charged by magnetic induction. The magnetic field created by primary induction coil 54 (when current is applied) induces a current in secondary induction coil 124 when secondary induction coil 124 is concentrically located relative to primary induction coil 54. In the present invention, this occurs when module 114 is placed within slot 16 (see FIG. 1).

It is preferable to ship battery pack 120 fully charged, as this will increase the shelf life of the Ni-Cad cells. However, shipping battery pack 120 fully charged requires the inclusion of means for electrically isolating battery pack 120 from lamp 118 between the time battery pack 120 is charged and when module 114 is first used by an end consumer. Such means could comprise a Mylar tab (not shown) inserted between two electrical contacts after the initial charging which would be removed by the consumer before first use. Alternatively, such means could comprise a fusible link (not shown). The fusible link would be adapted to close current regulating circuit 152 when current is sensed in charging circuit 150 (i.e., the first time the consumer plugs in charging stand 12).

Operation of lamp system 10 is elegantly straightforward. As described above, bulb 118 is designed to illuminate when no current is sensed in charging circuit 150. Thus, bulb 118 will automatically turn on when module 114 is removed from slot 16. Charging stand 12 and module 114 can also function as a table lamp by leaving module 114 in slot 16 and switching off inline power switch 26. Module 114 also functions as an emergency light—automatically turning on during a power failure.

The present invention in its broader aspects is not limited to the described embodiments, and departures may be made therefrom without departing from the principles of the invention and without sacrificing its primary advantages. Obviously, numerous modifications may be made to the present invention. Thus, the invention may be practiced otherwise than as specifically described herein.

What is claimed is:

1. A rechargeable lamp system, comprising:
   a recharging platter adapted to receive a set of luminaries including a first circuit coupled to each luminary of said set of luminaries received thereon operative in response to supplied AC power to provide a charge signal to each luminary of said set of luminaries; and
   a set of luminaries each having a light emitting element connected to a rechargeable battery pack via a second circuit operative in one mode to charge said rechargeable battery pack in response to said charge signal when each said luminary of said set of luminaries is received on said recharging platter and operative in another mode to activate said light emitting element in response to the absence of said charge signal, whereby, each said luminary of said set of luminaries lights if removed from said recharging platter and lights if no AC power is supplied to said recharging platter when received therein.

2. The rechargeable lamp system of claim 1, wherein said first circuit includes a manually actuated switch, and wherein each said luminary of said set of luminaries lights if no AC power is supplied in response to turning off said manually actuated switch.

3. The rechargeable lamp system of claim 1, wherein each said luminary of said set of luminaries lights if no AC power is supplied in response to an AC power service failure.

4. The rechargeable lamp system of claim 1, wherein the set of luminaries includes one or more luminaries.

5. The rechargeable lamp system of claim 4, wherein each luminary of said set of luminaries is inductively coupled to said charge signal provided by said first circuit of said recharging platter.

6. The rechargeable lamp system of claim 1, wherein, each luminary of said set of luminaries is self-standing and includes a diffusor.

7. The rechargeable lamp system of claim 6, wherein said diffusor of each luminary of said set of luminaries is mounted to a base member supporting said light emitting element therewithin.

8. The rechargeable lamp system of claim 6, wherein said diffusor is shaped to resemble a candle and is releasably mounted to said base member supporting said light emitting element therewithin.

9. The rechargeable lamp system of claim 1, wherein said first circuit includes an inductor responsive to said supplied AC signal to provide an inductive charge signal.

10. The rechargeable lamp system of claim 9, wherein said second circuit includes a latch controlled by a charge signal sensing switch to interrupt power from the battery pack to said light emitting element when the charge signal is sensed.

11. The rechargeable lamp of claim 10, wherein said second circuit includes an inductor responsive to said inductive charge signal to inductively couple the same to said rechargeable battery pack.

12. An autoilluminating rechargeable lamp system, comprising:
    a recharging platter removably receiving a set of luminaries including a charge circuit providing a charge signal to each luminary of said set of luminaries received on said platter;
    a set of luminaries each including a lamp and a rechargeable battery pack connected to said lamp; and
    autoilluminating means coupled to each luminary of said set of luminaries and responsive to said charge signal for lighting said lamp of each luminary in response to non-detection of said charge signal, and for turning said lamp of each luminary "off" in response to detection of said charge signal, whereby, each said luminary of said set of luminaries lights if removed from said recharging platter and is turned "off" if received on said recharging platter.

13. The rechargeable lamp system of claim 12, wherein said set includes one or more luminaries.

14. The rechargeable lamp system of claim 13, further including a manually actuated switch coupled to said platter operative to interrupt said charge signal by manual actuation of said switch.

15. The rechargeable lamp system of claim 13, wherein said means includes a circuit coupled to each luminary including a charge signal sensing switch response to interruption of said charge signal to light each luminary.

16. A rechargeable lamp system, comprising:
    a recharging platter adapted to receive a set of luminaries including a first circuit coupled to each luminary of said set of luminaries received thereon operative in response to supplied AC power to provide a charge signal to each luminary of said set of luminaries; and
    a set of luminaries each having a light emitting element connected to a rechargeable battery pack via a second circuit operative in one mode to charge said rechargeable battery pack in response to said charge signal when each said luminary of said set of luminaries is received on said recharging platter and operative in another mode to activate said light emitting element in response to the absence of said charge signal, whereby, each said luminary of said set of luminaries lights if removed from said recharging platter.

* * * * *